US011331816B2

(12) United States Patent
Muneto et al.

(10) Patent No.: US 11,331,816 B2
(45) Date of Patent: May 17, 2022

(54) ARTICULATED ROBOT

(71) Applicant: KAWASAKI JUKOGYO KABUSHIKI KAISHA, Kobe (JP)

(72) Inventors: Koji Muneto, Kobe (JP); Shinji Kitamura, Kako-gun (JP); Atsushi Kameyama, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 150 days.

(21) Appl. No.: 16/643,690

(22) PCT Filed: Aug. 24, 2018

(86) PCT No.: PCT/JP2018/031338
§ 371 (c)(1),
(2) Date: Mar. 2, 2020

(87) PCT Pub. No.: WO2019/044692
PCT Pub. Date: Mar. 7, 2019

(65) Prior Publication Data
US 2021/0154864 A1    May 27, 2021

(30) Foreign Application Priority Data

Aug. 31, 2017  (JP) .............................. JP2017-167714

(51) Int. Cl.
B25J 17/02       (2006.01)
B25J 9/12        (2006.01)
(52) U.S. Cl.
CPC .......... B25J 17/0258 (2013.01); B25J 9/126 (2013.01)

(58) Field of Classification Search
CPC ........ B25J 17/0258; B25J 9/126; B25J 9/161; B25J 9/1617; G05B 2219/33105; G05B 2219/36433
See application file for complete search history.

(56) References Cited

U.S. PATENT DOCUMENTS

2003/0040249 A1   2/2003 Yim et al.
2004/0128029 A1   7/2004 Kato et al.
(Continued)

FOREIGN PATENT DOCUMENTS

EP   0 441 397 A1   8/1991
JP   H04-217478 A   8/1992
(Continued)

Primary Examiner — Zakaria Elahmadi
(74) Attorney, Agent, or Firm — Oliff PLC

(57) ABSTRACT

An articulated robot includes: different types of joint units, each including a stationary body, a stationary body-side mechanical connector for connection to another unit, a displaceable body coupled to the stationary body by a coupler, a displaceable body-side mechanical connector for connection to another unit, and an actuator to displace the displaceable body relative to the stationary body; and a control unit including a controller to control the actuator and a control unit mechanical connector for connection to another unit, wherein displacement undergone by the displaceable body-side mechanical connector relative to the stationary body-side mechanical connector differs depending on the type of the joint unit, the stationary body-side mechanical connector includes a first connection structure, the displaceable body-side mechanical connector and the control unit mechanical connector each include a second connection structure, and the first and the second connection structure are connectable to each other.

8 Claims, 9 Drawing Sheets

(56) References Cited

U.S. PATENT DOCUMENTS

| | | | |
|---|---|---|---|
| 2012/0286629 A1* | 11/2012 | Johnson | B25J 9/08 310/68 B |
| 2013/0340560 A1* | 12/2013 | Burridge | B25J 17/025 74/490.05 |
| 2014/0039678 A1* | 2/2014 | Motoyoshi | B25J 9/1694 700/258 |
| 2016/0073584 A1* | 3/2016 | Davidson | B25J 9/1697 56/328.1 |
| 2016/0221189 A1* | 8/2016 | Nilsson | B25J 9/1653 |
| 2016/0279792 A1* | 9/2016 | Motoyoshi | B25J 9/1633 |
| 2016/0288327 A1* | 10/2016 | Motoyoshi | G05B 19/231 |
| 2017/0259430 A1* | 9/2017 | Yoon | B25J 18/02 |
| 2017/0259435 A1* | 9/2017 | Yoon | B25J 18/02 |
| 2017/0266807 A1* | 9/2017 | Gombert | B25J 9/1617 |
| 2017/0291311 A1* | 10/2017 | Yoon | F16G 13/20 |
| 2018/0079077 A1* | 3/2018 | Yoon | B25J 9/1664 |
| 2018/0099422 A1* | 4/2018 | Yoon | B25J 13/084 |
| 2018/0161984 A1* | 6/2018 | Ishige | B25J 19/023 |
| 2018/0207803 A1* | 7/2018 | Takase | B25J 18/02 |
| 2018/0215054 A1* | 8/2018 | Brudniok | B25J 19/063 |
| 2018/0361597 A1* | 12/2018 | Yoon | B25J 18/025 |
| 2019/0015166 A1* | 1/2019 | Mahoney | A61B 34/30 |
| 2019/0030733 A1* | 1/2019 | Yoon | B25J 17/0258 |
| 2019/0193328 A1* | 6/2019 | Mantha | B29C 64/165 |
| 2019/0351180 A1* | 11/2019 | Ryu | B23K 26/382 |
| 2020/0298403 A1* | 9/2020 | Nilsson | B25J 9/1653 |
| 2020/0306961 A1* | 10/2020 | Hiraide | B25J 9/1628 |
| 2021/0060793 A1* | 3/2021 | Wang | B25J 18/00 |

FOREIGN PATENT DOCUMENTS

| | | |
|---|---|---|
| JP | H11-123676 A | 5/1999 |
| JP | 2003-103063 A | 4/2003 |
| JP | 2004-148433 A | 5/2004 |
| JP | 2007-276067 A | 10/2007 |
| JP | 4543369 B2 | 9/2010 |
| JP | 2016-538150 A | 12/2016 |
| KR | 10-2017-0053499 A | 5/2017 |

* cited by examiner

ARTICULATED ROBOT

TECHNICAL FIELD

The present invention relates to articulated robots.

BACKGROUND ART

Articulated robots varying in the degrees of freedom have conventionally been developed. An articulated robot having appropriate degrees of freedom, i.e., an appropriate number of joints, is prepared according to the contents of the work to be done. For example, if the contents of the work are to be changed, an articulated robot different in the degrees of freedom from the currently used articulated robot may need to be prepared. Patent Literature 1 discloses an articulated robot whose degrees of freedom can easily be changed by changing the number of joints from the current number to another.

FIG. 6 of Patent Literature 1 discloses an articulated robot having three degrees of freedom, the articulated robot being constructed of three actuator devices having the same configuration and connected in series by connection blocks. In this articulated robot, the degrees of freedom can be changed by increasing the number of the actuator devices forming joints and the number of the connection blocks for connecting the actuator devices.

CITATION LIST

Patent Literature

PTL 1: Japanese Patent No. 4543369

SUMMARY OF INVENTION

Technical Problem

However, the above articulated robot requires the connection blocks for coupling the actuator devices forming joints. As such, the number of components to be coupled is large, and the work of changing the degrees of freedom of the articulated robot is cumbersome.

It is therefore an object of the present invention to provide an articulated robot whose degrees of freedom can be changed more easily.

Solution to Problem

In order to solve the problem described above, an articulated robot according to the present invention includes a plurality of units coupled in order from a proximal end of the articulated robot to a distal end of the articulated robot, the plurality of units including: different types of joint units, each joint unit including a stationary body, a stationary body-side mechanical connector provided in the stationary body for mechanical connection to another unit of the plurality of units, a displaceable body coupled to the stationary body by a coupler, a displaceable body-side mechanical connector provided in the displaceable body for mechanical connection to another unit of the plurality of units, and an actuator configured to displace the displaceable body relative to the stationary body; and a control unit including a controller configured to control the actuator and a control unit mechanical connector for mechanical connection to another unit of the plurality of units, wherein displacement undergone by the displaceable body-side mechanical connector relative to the stationary body-side mechanical connector upon displacement of the displaceable body relative to the stationary body differs depending on the type of the joint unit, the stationary body-side mechanical connector includes a first connection structure, the displaceable body-side mechanical connector and the control unit mechanical connector each include a second connection structure, and the first connection structure and the second connection structure are connectable to each other.

In the above configuration, the stationary body-side mechanical connectors of the different types of joint units have the same first connection structure, and the displaceable body-side mechanical connectors of the different types of joint units and the control unit mechanical connector have the same second connection structure which is connectable to the first connection structure. As such, when the contents of the work of the articulated robot are to be changed, the number of the joint units included in the articulated robot can easily be increased or decreased, or the positions of the different types of joint units can easily be interchanged, according to the work to be done. Thus, an articulated robot can be provided which allows easy change of the degrees of freedom.

In the above articulated robot, for example, the different types of joint units include at least: a torsion joint unit configured to rotate the displaceable body relative to the stationary body about an axis extending in a direction from the stationary body-side mechanical connector to the coupler; and a bending joint unit configured to rotate the displaceable body relative to the stationary body about an axis perpendicular to a direction from the stationary body-side mechanical connector to the coupler.

In the above articulated robot, the plurality of units may include an end effector unit including an end effector configured to perform a specific work, and the end effector unit may include an end effector unit mechanical connector for mechanical connection to another unit of the plurality of units, the end effector unit mechanical connector including the first connection structure. In this configuration, the end effector unit mechanical connector having the first connection structure is connectable to the displaceable body-side mechanical connector having the second connection structure, and thus the end effector unit can easily be connected to any type of joint unit.

In the above articulated robot, each joint unit may include a stationary body-side electrical connector provided in the stationary body for electrical connection to another unit of the plurality of units, a displaceable body-side electrical connector provided in the displaceable body for electrical connection to another unit of the plurality of units, and a wiring part configured to establish electrical connection between the stationary body-side electrical connector and the displaceable body-side electrical connector, the control unit may include a control unit electrical connector for electrical connection to another unit of the plurality of units, the control unit electrical connector being configured to allow the controller to output a control signal for control of the actuator, the stationary body-side electrical connector may include a third connection structure, the displaceable body-side electrical connector and the control unit electrical connector may each include a fourth connection structure, and the third connection structure and the fourth connection structure may be connectable to each other. In this configuration, two units can be electrically connected once they are mechanically connected. Hence, a control signal output from the control unit can be sent in the direction from the proximal end to the distal end of the articulated robot through the wiring parts of the joint units coupled together.

In the above articulated robot, the actuator may include a motor, and each joint unit may include a motor driver configured to, based on a control signal sent from the control unit, generate a motor current delivered to the motor. In this configuration, since each of the joint units includes the motor driver, the control unit need not be provided with motor drivers for actuating the joint units, and thus the control unit can be made compact. Further, in this configuration, the number of the joint units coupled is not limited by the number of motor drivers which would otherwise be included in the control unit.

In the above articulated robot, each joint unit may include a memory storing type information for identification of the type of the joint unit. In this configuration, the control unit can retrieve the type information from the memory of the joint unit to control the joint unit appropriately depending on the type of the joint unit.

The above memory may store positional information indicating a predetermined position of the displaceable body relative to the stationary body. In this configuration, for example, a posture to be assumed by each joint unit in order to allow the articulated robot to assume a certain posture can be stored in the joint unit itself.

In the above articulated robot, the control unit may include a wireless communicator configured to wirelessly communicate with an external mobile terminal. In this configuration, the user can send a motion command to the articulated robot by operating the external mobile terminal.

In the above articulated robot, each joint unit may include a notifier configured to provide a notification that allows distinguishing whether the joint unit is in a normal state or an abnormal state. In this configuration, the presence or absence of an abnormality in each joint unit can be known through the notifier of the joint unit, and replacement of a joint unit which is in an abnormal state is facilitated.

Advantageous Effects of Invention

The present invention can provide an articulated robot whose degrees of freedom can easily be changed.

DESCRIPTION OF EMBODIMENTS

Hereinafter, an embodiment of the present invention will be described with reference to the drawings.

Configuration of Articulated Robot 1

Figure 1:
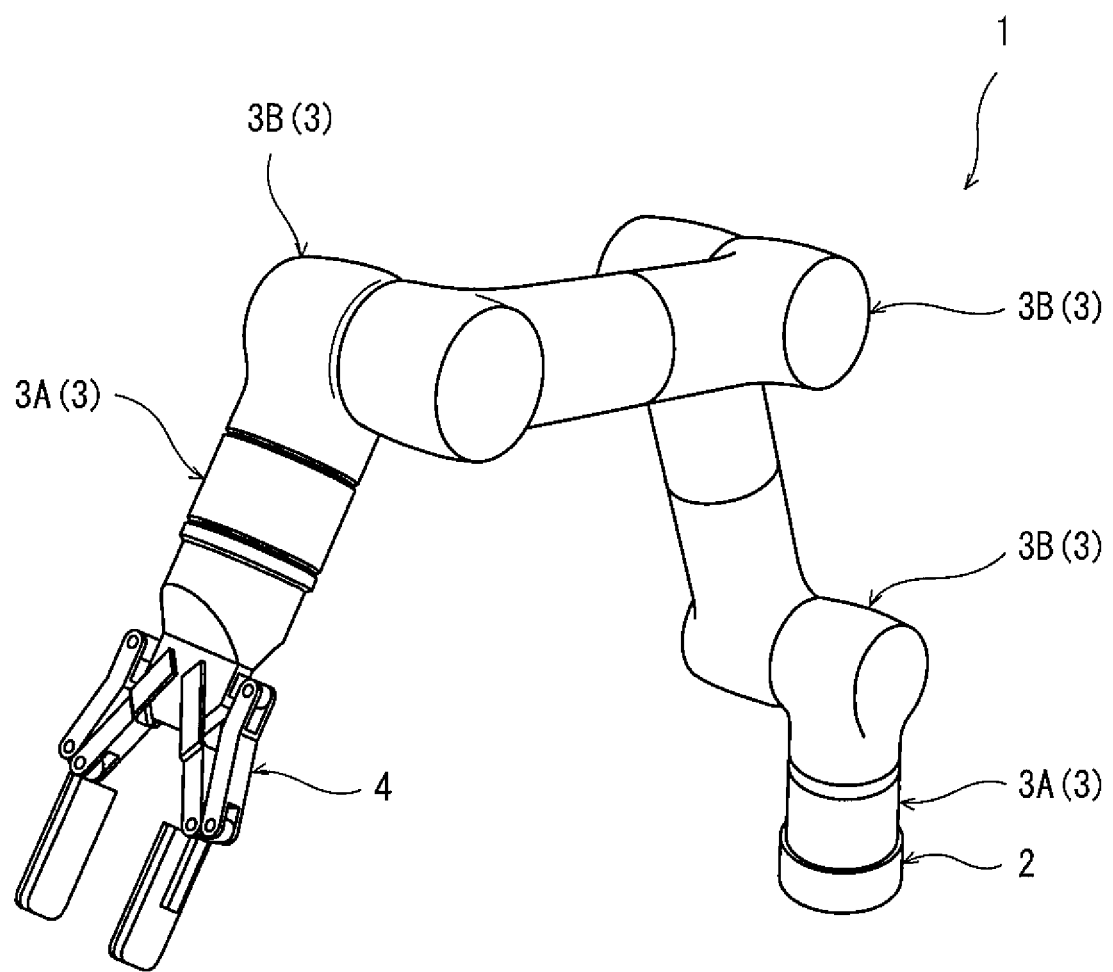
FIG. 1 is a perspective view of an articulated robot according to one embodiment of the present invention.

FIG. 1 is a perspective view of an articulated robot 1 according to the present embodiment. As shown in FIG. 1, the articulated robot 1 is constructed of a plurality of units coupled in order from the proximal end of the robot to the distal end of the robot. Specifically, the articulated robot 1 is constructed of a control unit 2, different types of joint units 3, and an end effector unit 4 which are coupled together. The control unit 2 is disposed at the proximal end of the articulated robot 1, and the end effector unit 4 is disposed at the distal end of the articulated robot 1. The different types of joint units 3 are coupled in series between the control unit 2 and the end effector unit 4.

In the present embodiment, the different types of joint units 3 include two torsion joint units 3A and three bending joint units 3B. That is, the articulated robot 1 is a five-axis robot having five joints. The articulated robot 1 is used together with a base (not illustrated) holding the control unit 2, such as a base for mounting to a wall, a base for mounting to a ceiling, a base for mounting to a floor, or a clip base for mounting to a platform. Hereinafter, the units 2, 3, and 4 will be described individually. In the following description, the terms "proximal end side" and "distal end side" may be used in relation to the units 2, 3, and 4 for convenience; specifically, the term "proximal end side" as used in relation to the unit 2, 3, or 4 refers to a portion located toward the proximal end of the articulated robot 1 as constructed of the units 2, 3, and 4 coupled together, and the term "distal end side" refers to a portion located toward the distal end of the articulated robot 1.

Configuration of Control Unit 2

Figure 2:
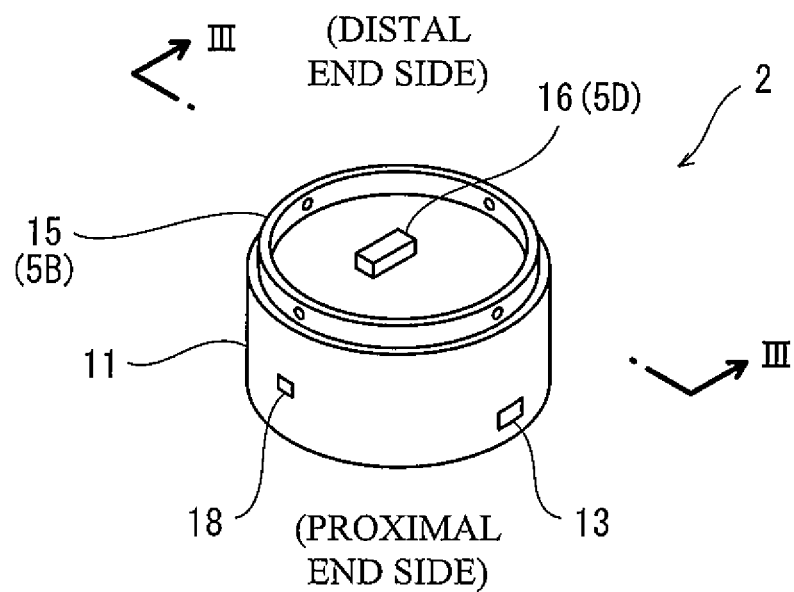
FIG. 2 is a perspective view of a control unit of the articulated robot shown in FIG. 1.
Figure 3:
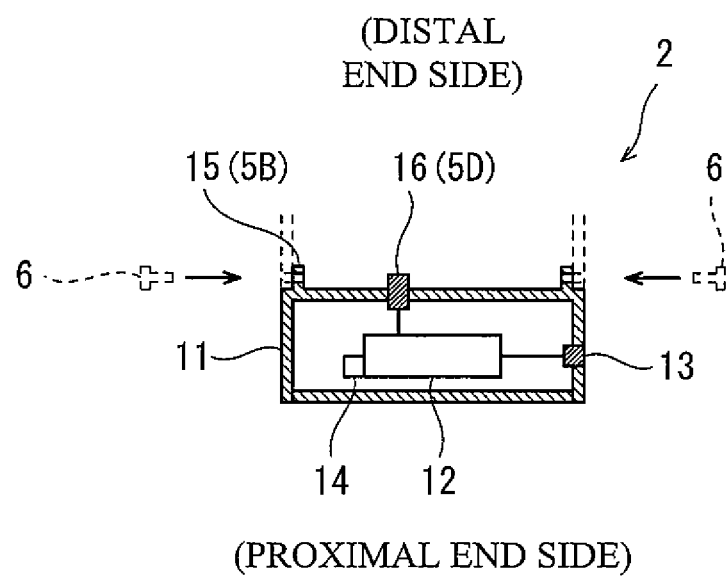
FIG. 3 is a schematic cross-sectional view taken along the arrow III-III of FIG. 2.

First, the control unit 2 will be described with reference to FIGS. 2 and 3. FIG. 2 is a perspective view of the control unit 2, and FIG. 3 is a schematic cross-sectional view taken along the arrow III-III of FIG. 2. The control unit 2 includes a casing 11 in the shape of a circular cylinder and a controller 12 built in the casing 11. The controller 12 controls the motion of the articulated robot 1. The controller 12 is, for example, a circuit module including a CPU, a ROM, and a RAM. An electrical power supply port 13 is provided on the circumferential surface of the casing 11. The controller 12 receives electrical power supplied from an external power supply through the electrical power supply port 13.

Inside the casing 11 there is provided a wireless communicator 14. The wireless communicator 14 is connected to the controller 12 by a bus. The wireless communicator 14 communicates with a mobile terminal 17 (see FIG. 10) external to the control unit 2 by means of Bluetooth (registered trademark) or infrared communication. The controller 12 of the control unit 2 may be communicatively connected to an external computer via a wire.

A control unit mechanical connector 15 in the shape of a circle is provided at one end (the end of the distal end side) of the circular cylindrical casing 11. The control unit mechanical connector 15 is a connector for mechanical connection to the joint unit 3. The control unit mechanical connector 15 includes a second connection structure 5B as described later.

A control unit electrical connector 16 is also provided at the one end (the end of the distal end side) of the circular cylindrical casing 11. The control unit electrical connector 16 is a connector for electrical connection to the joint unit 3 mechanically connected by the control unit mechanical connector 15 mentioned above. The control unit electrical connector 16 includes a fourth connection structure 5D as described later.

As shown in FIG. 2, a light emitter 18 is provided on the circumferential surface of the circular cylindrical casing 11, and this light emitter 18 provides light emission that allows distinguishing whether the control unit 2 is in a normal state or an abnormal state. The light emitter 18 may, for example, consist of one LED or a plurality of LEDs.

Configurations of Joint Units 3

Next, the joint units 3 will be described. In the present embodiment, all types of joint units 3, i.e., both the torsion joint unit 3A and the bending joint unit 3B, include a stationary body and a displaceable body (hereinafter referred to as "rotatable body") rotatable relative to the stationary body. The stationary body is provided with a stationary body-side mechanical connector for mechanical connection to another unit. The rotatable body is provided with a rotatable body-side mechanical connector for mechanical connection to another unit. The different types of joint units 3 differ in the displacement undergone by the rotatable body-side mechanical connector relative to the stationary body-side mechanical connector upon displacement of the rotatable body relative to the stationary body. Hereinafter, the torsion joint unit 3A and bending joint unit 3B will be individually described in detail.

Configuration of Torsion Joint Unit 3A

Figure 4:
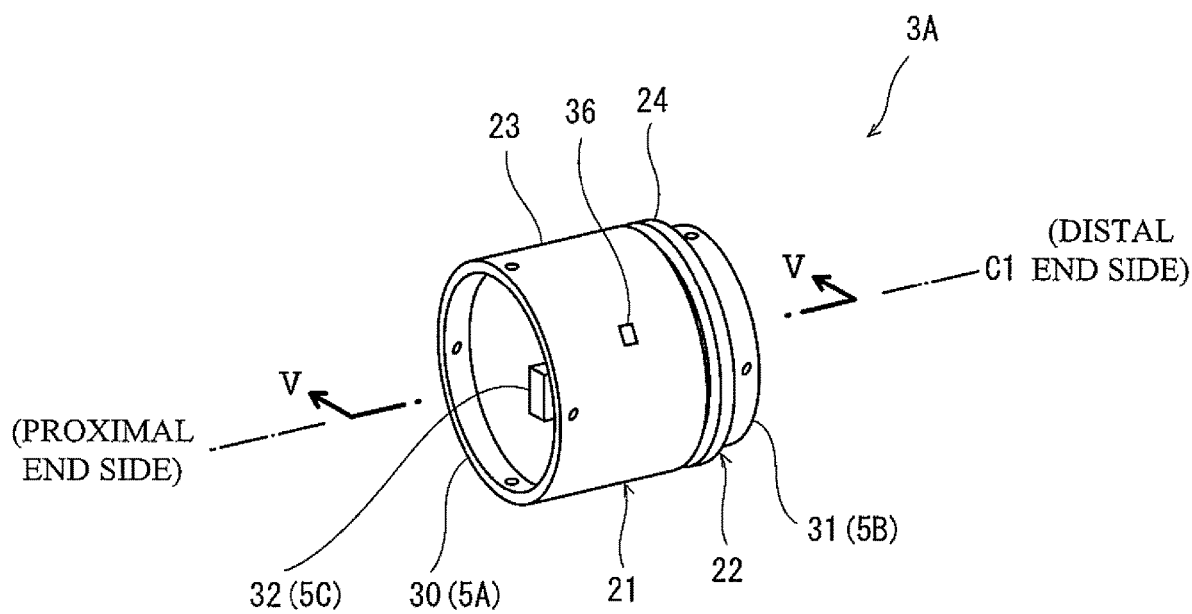
FIG. 4 is a perspective view of a torsion joint unit of the articulated robot shown in FIG. 1.
Figure 5:
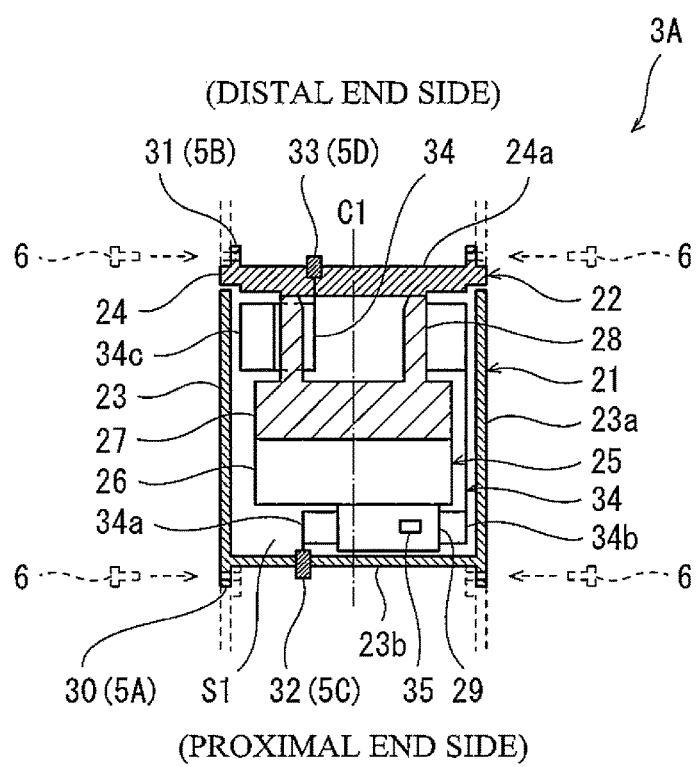
FIG. 5 is a schematic cross-sectional view taken along the arrow V-V of FIG. 4.

The torsion joint unit 3A will first be described with reference to FIGS. 4 and 5. FIG. 4 is a perspective view of the torsion joint unit 3A, and FIG. 5 is a schematic cross-sectional view taken along the arrow V-V of FIG. 4. The torsion joint unit 3A includes a stationary body 21 in the shape of a circular cylinder and a rotatable body 22 in the shape of a disc or a short, circular cylinder, and the stationary body 21 and the rotatable body 22 are placed on each other to present the shape of a circular cylinder as a whole. The stationary body 21 and the rotatable body 22 are coupled such that the rotatable body 22 is rotatable about a centerline C1 of these bodies. The stationary body 21 is located toward the proximal end of the articulated robot 1, and the rotatable body 22 is located toward the distal end of the articulated robot 1.

The stationary body 21 includes a stationary body-side casing part 23, and the rotatable body 22 includes a rotatable body-side casing part 24. These stationary body-side casing part 23 and rotatable body-side casing part 24 form an internal space S1. The stationary body-side casing part 23 includes a circumferential wall part 23a in the shape of a hollow circular cylinder and a proximal end-side wall part 23b covering a proximal end-side opening of the circumferential wall part 23a which is in the shape of a hollow circular cylinder. The rotatable body-side casing part 24 incudes a distal end-side wall part 24a covering a distal end-side opening of the circumferential wall part 23a which is in the shape of a hollow circular cylinder.

The stationary body 21 includes an actuator 25. The actuator 25 actuates the rotatable body 22 such that the rotatable body 22 rotates about the centerline C1 relative to the stationary body 21. The actuator 25 is disposed in the internal space S1 and supported by the stationary body-side casing part 23. The actuator 25 includes a motor 26 and a reduction gear 27 configured to reduce the speed of rotation transmitted from an unillustrated output shaft of the motor 26 and output rotation at the reduced speed.

The reduction gear 27 is provided with a hollow cylindrical part 28 rotatable together with the output shaft of the reduction gear 27. The hollow cylindrical part 28 extends along the centerline C1 in a direction from the reduction gear 27 toward the rotatable body 22, and the end of the distal end side of the hollow cylindrical part 28 is secured to the rotatable body-side casing part 24 of the rotatable body 22. That is, the stationary body 21 and the rotatable body 22 are coupled together by the hollow cylindrical part 28, and the hollow cylindrical part 28 of the torsion joint unit 3A corresponds to the coupler of the present invention. The coupler coupling the stationary body 21 and the rotatable body 22 need not be in the shape of a hollow cylinder and may be, for example, in the shape of a rod or a solid cylinder.

The stationary body 21 includes a motor driver 29 configured to control driving of the motor 26 and a position detector 26a (see FIG. 10) configured to detect the rotational position of the motor 26. The motor driver 29 includes an amplifier, and generates a motor current delivered to the motor 26 based on a control signal sent from the control unit 2. The position detector 26a detects the rotational position (rotational angle) of the motor shaft and gives feedback to the motor driver 29. The position detector 26a may be, for example, a resolver or an encoder.

A stationary body-side mechanical connector 30 is provided at the end of the proximal end side of the stationary body 21. The stationary body-side mechanical connector 30 is a connector for mechanical connection to another unit at the proximal end side. The stationary body-side mechanical connector 30 includes a first connection structure 5A as described later. A rotatable body-side mechanical connector 31 is provided at the end of the distal end side of the rotatable body 22. The rotatable body-side mechanical connector 31 is a connector for mechanical connection to another unit at the distal end side. The rotatable body-side mechanical connector 31 includes a second connection structure 5B as described later.

A stationary body-side electrical connector 32 is provided at the end of the proximal end side of the stationary body 21. The stationary body-side electrical connector 32 is a connector for electrical connection to another unit at the proximal end side. The stationary body-side mechanical connector 30 is supported by the stationary body-side casing part 23. The stationary body-side electrical connector 32 includes a third connection structure 5C as described later. A rotatable body-side electrical connector 33 is provided at the end of the distal end side of the rotatable body 22. The rotatable body-side electrical connector 33 is a connector for electrical connection to another unit at the distal end side. The rotatable body-side electrical connector 33 is supported by the rotatable body-side casing part 24. The rotatable body-side electrical connector 33 includes a fourth connection structure 5D as described later.

The stationary body 21 includes a wiring part 34 configured to establish electrical connection between the stationary body-side electrical connector 32 and the rotatable body-side electrical connector 33. The wiring part 34 is disposed in the internal space S1. The wiring part 34 includes a first wiring part 34a, a second wiring part 34b, a third wiring part 34c, and a fourth wiring part 34d, which are arranged in this order from the stationary body-side electrical connector 32 to the rotatable body-side electrical connector 33.

The first wiring part 34a is secured to the stationary body-side casing part 23 and leads from the stationary body-side electrical connector 32 to the motor driver 29. The second wiring part 34b is secured to the stationary body-side casing part 23, extends from the motor driver 29 toward the distal end along the centerline C1, and leads to a location radially outward of the hollow cylindrical part 28.

The third wiring part 34c is formed in the shape of a strip and configured to absorb rotational displacement of the rotatable body 22 relative to the stationary body 21. Specifically, one end of the third wiring part 34c is connected to the second wiring part 34b and secured to the stationary body-side casing part 23. The other end of the third wiring part 34c is secured to the hollow cylindrical part 28. The third wiring part 34c extends from the one end in one circumferential direction along the outer circumference of the hollow cylindrical part 28, is bent at a certain point and turned back toward the hollow cylindrical part 28, and extends in the opposite circumferential direction to the other end. Thus, when the rotatable body 22 rotates relative to the stationary body 21, the third wiring part 34c changes shape while changing the position of the bend where the third wiring part 34c is turned back.

The fourth wiring part 34d extends from the end of the distal end side of the third wiring part 34c, passes through the inside of the hollow cylindrical part 28, and leads to the rotatable body-side electrical connector 33 located in a central portion of the rotatable body 22.

The motor driver 29 is provided with a memory 35 storing type information for identification of the type of the joint unit 3 including the motor driver 29, i.e., identification of the joint unit 3 as the torsion joint unit 3A. The memory 35 is, for example, a flash memory. The memory 35 further stores rotational position information indicating a predetermined rotational position of the rotatable body 22 relative to the stationary body 21. The memory 35 further stores manufacturing information such as a manufacturing number of the torsion joint unit 3A including the memory 35.

A light emitter 36 is provided on the outer circumferential surface of the hollow cylindrical stationary body-side casing part 23 of the stationary body 21, and the light emitter 36 is configured to provide light emission that allows distinguishing whether the torsion joint unit 3A is in a normal state or an abnormal state (this light emitter corresponds to the notifier of the present invention). The light emitter 36 may, for example, consist of one LED or a plurality of LEDs.

Configuration of Bending Joint Unit 3B

Figure 6:
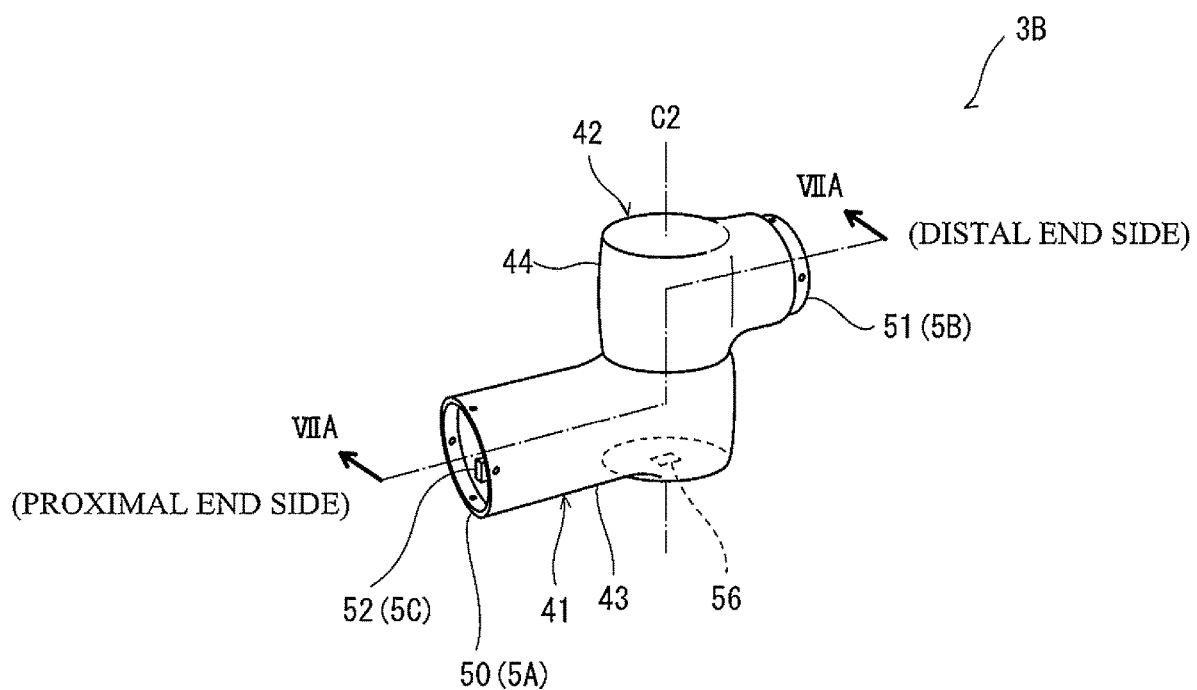
FIG. 6 is a perspective view of a bending joint unit of the articulated robot shown in FIG. 1.
Figure 7A:
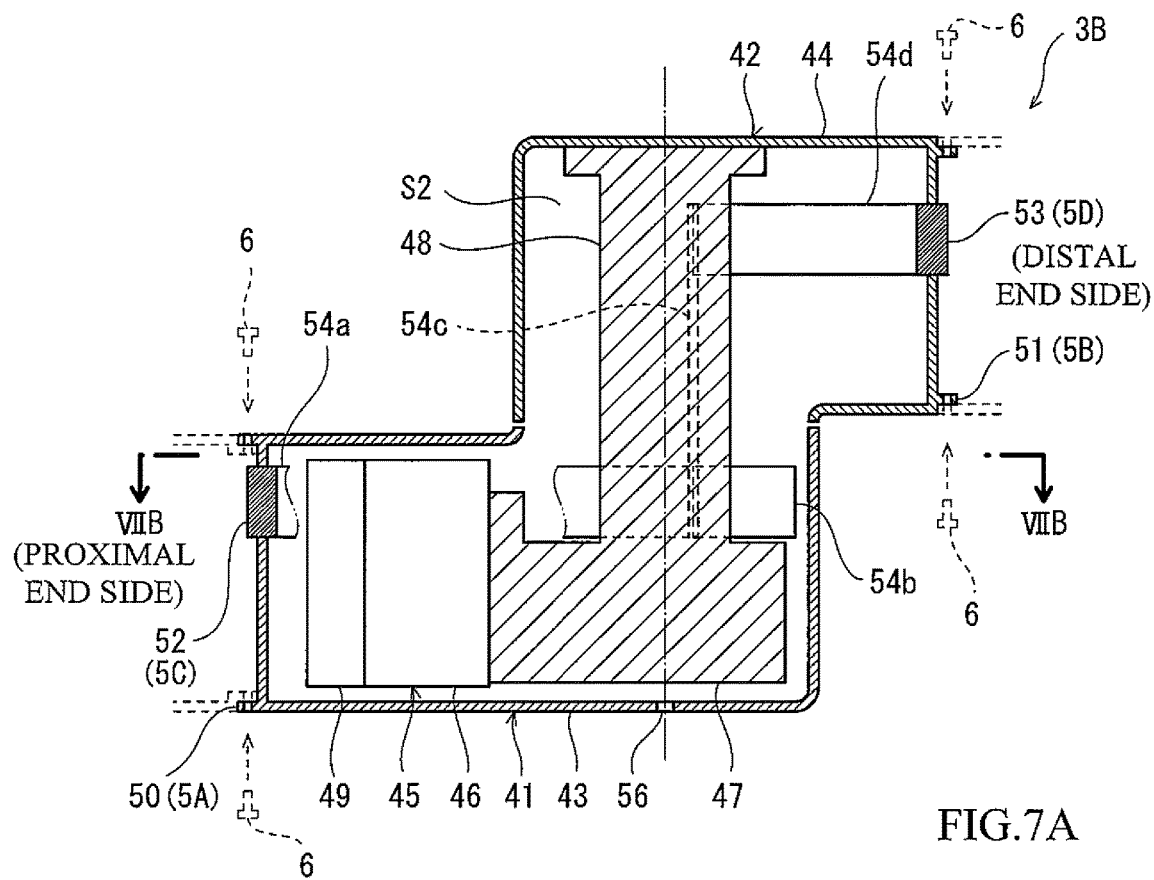
FIG. 7A is a schematic cross-sectional view taken along the arrow VIIA-VIIA of FIG. 6.
Figure 7B:
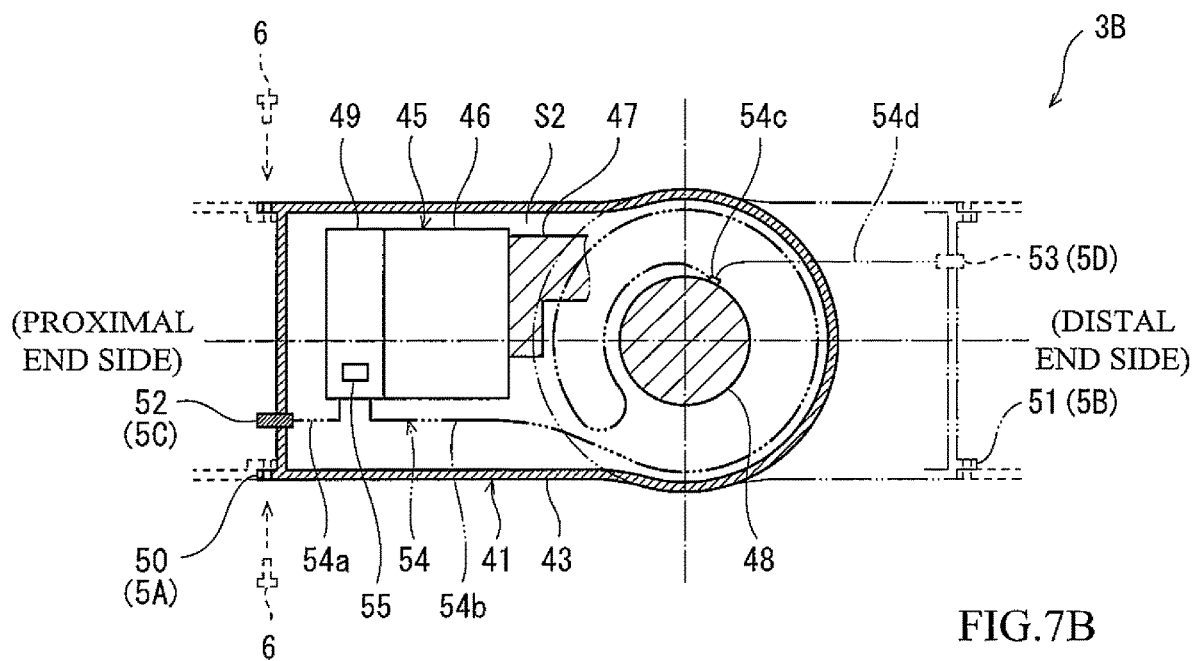
FIG. 7B is a cross-sectional view taken along the arrow VIIB-VIIB of FIG. 7A.

Next, the bending joint unit 3B will be described with reference to FIGS. 6, 7A, and 7B. FIG. 6 is a perspective view of the bending joint unit 3B, FIG. 7A is a schematic cross-sectional view taken along the arrow VIIA-VIIA of FIG. 6, and FIG. 7B is a cross-sectional view taken along the arrow VIIB-VIIB of FIG. 7A. The bending joint unit 3B includes a stationary body 41 in the shape of a circular cylinder and a rotatable body 42 in the shape of a circular cylinder. A longitudinal end of the stationary body 41 and a longitudinal end of the rotatable body 42 are coupled such that the rotatable body 42 is rotatable about a rotational axis C2 perpendicular to the longitudinal directions of these bodies.

The stationary body 41 includes a stationary body-side casing part 43, and the rotatable body 42 includes a rotatable body-side casing part 44. These stationary body-side casing part 43 and rotatable body-side casing part 44 form an internal space S2. The stationary body-side casing part 43 and rotatable body-side casing part 44 are similar in shape. Each of the stationary body-side casing part 43 and rotatable body-side casing part 44 is generally in the shape of a circular cylinder and has an opening at one longitudinal end, the opening facing in a direction perpendicular to the longitudinal direction of the casing part. The stationary body-side casing part 43 and the rotatable body-side casing part 44 are arranged such that their openings are aligned with each other.

The stationary body 41 includes an actuator 45. The actuator 45 actuates the rotatable body 42 such that the rotatable body 42 rotates about the rotational axis C2 relative to the stationary body 41. The actuator 45 is disposed in the internal space S2 and supported by the stationary body-side casing part 43. The actuator 45 includes a motor 46 and a reduction gear 47 configured to reduce the speed of rotation transmitted from an unillustrated output shaft of the motor 46 and output rotation at the reduced speed.

The reduction gear 47 is disposed at the end of the distal end side of the stationary body 21. The reduction gear 47 is provided with a solid circular cylindrical part 48 rotatable together with the output shaft of the reduction gear 47. The solid circular cylindrical part 48 extends along the rotational axis C2 in a direction from the reduction gear 47 toward the rotatable body 42, and the end of the distal end side of the solid circular cylindrical part 48 is secured to the rotatable body-side casing part 44 of the rotatable body 42. That is, the stationary body 41 and the rotatable body 42 are coupled together by the solid circular cylindrical part 48, and the solid circular cylindrical part 48 of the bending joint unit 3B corresponds to the coupler of the present invention. The coupler connecting the stationary body 41 and the rotatable body 42 need not be in the shape of a solid cylinder and may be, for example, in the shape of a rod or a hollow cylinder.

The stationary body 41 includes a motor driver 49 configured to control driving of the motor 46 and a position detector 46a (see FIG. 10) configured to detect the rotational position of the motor 46. The motor driver 49 includes an amplifier, and generates a motor current delivered to the motor 46 based on a control signal sent from the control unit 2. The position detector 46a detects the rotational position (rotational angle) of the motor shaft and gives feedback to the motor driver 49. The position detector 46a may be, for example, a resolver or an encoder.

A stationary body-side mechanical connector 50 is provided at the end of the proximal end side of the stationary body 41. The stationary body-side mechanical connector 50 is a connector for mechanical connection to another unit at the proximal end side. The stationary body-side mechanical connector 50 includes a first connection structure 5A as described later. A rotatable body-side mechanical connector 51 is provided at the end of the distal end side of the rotatable body 42. The rotatable body-side mechanical connector 51 is a connector for mechanical connection to another unit at the distal end side. The rotatable body-side mechanical connector 51 includes a second connection structure 5B as described later.

A stationary body-side electrical connector 52 is provided at the end of the proximal end side of the stationary body 41. The stationary body-side electrical connector 52 is a connector for electrical connection to another unit at the proximal end side. The stationary body-side mechanical connector 50 is supported by the stationary body-side casing part 43. The stationary body-side electrical connector 52 includes a third connection structure 5C as described later. A rotatable body-side electrical connector 53 is provided at the end of the distal end side of the rotatable body 42. The rotatable body-side electrical connector 53 is a connector for electrical connection to another unit at the distal end side. The rotatable body-side electrical connector 53 is supported by the rotatable body-side casing part 44. The rotatable body-side electrical connector 53 includes a fourth connection structure 5D as described later.

The stationary body 41 includes a wiring part 54 configured to establish electrical connection between the stationary body-side electrical connector 52 and the rotatable body-side electrical connector 53. The wiring part 54 is disposed in the internal space S2. The wiring part 54 includes a first wiring part 54a, a second wiring part 54b, a third wiring part 54c, and a fourth wiring part 54d, which are arranged in this order from the stationary body-side electrical connector 52 to the rotatable body-side electrical connector 53.

The first wiring part 54a is secured to the stationary body-side casing part 43 and leads from the stationary body-side electrical connector 52 to the motor driver 49.

The second wiring part 54b is formed in the shape of a strip and configured to absorb rotational displacement of the rotatable body 42 relative to the stationary body 41. Specifically, one end of the second wiring part 54b is connected to the motor driver 49, and the other end of the second wiring part 54b is secured to the solid circular cylindrical part 48. The second wiring part 54b extends from the one end toward the circular cylindrical part 48, then extends in one circumferential direction along the outer circumference of the solid circular cylindrical part 48, is bent at a certain point and turned back toward the solid circular cylindrical part 48, and extends in the opposite circumferential direction to the other end. Thus, when the rotatable body 42 rotates relative to the stationary body 41, the second wiring part 54b changes shape while changing the position of the bend where the second wiring part 54b is turned back.

The third wiring part 54c is secured to the solid circular cylindrical part 48. The third wiring part 54c extends from the end of the distal end side of the second wiring part 54b toward the rotatable body 42 in the longitudinal direction of the solid circular cylindrical part 48. The fourth wiring part 54d extends from the end of the distal end side of the third wiring part 54c in the longitudinal direction of the rotatable body 42 and leads to the rotatable body-side electrical connector 53.

The motor driver 49 is provided with a memory 55 storing type information for identification of the type of the joint unit 3 including the motor driver 49, i.e., identification of the joint unit 3 as the bending joint unit 3B. The memory 55 is, for example, a flash memory. The memory 55 further stores rotational position information indicating a predetermined rotational position of the rotatable body 42 relative to the stationary body 41. The memory 55 further stores manufacturing information such as a manufacturing number of the bending joint unit 3B including the memory 55.

A light emitter 56 is provided on the outer circumferential surface of the hollow cylindrical stationary body-side casing part 43 of the stationary body 41, and the light emitter 56 is configured to provide light emission that allows distinguishing whether the bending joint unit 3B is in a normal state or an abnormal state (this light emitter corresponds to the notifier of the present invention). The light emitter 56 may, for example, consist of one LED or a plurality of LEDs.

Configuration of End Effector Unit 4

Figure 8:
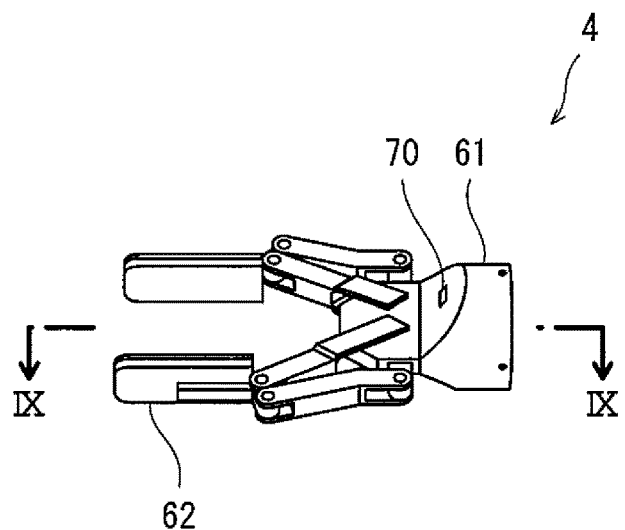
FIG. 8 is a perspective view of an end effector unit of the articulated robot shown in FIG. 1.
Figure 9:
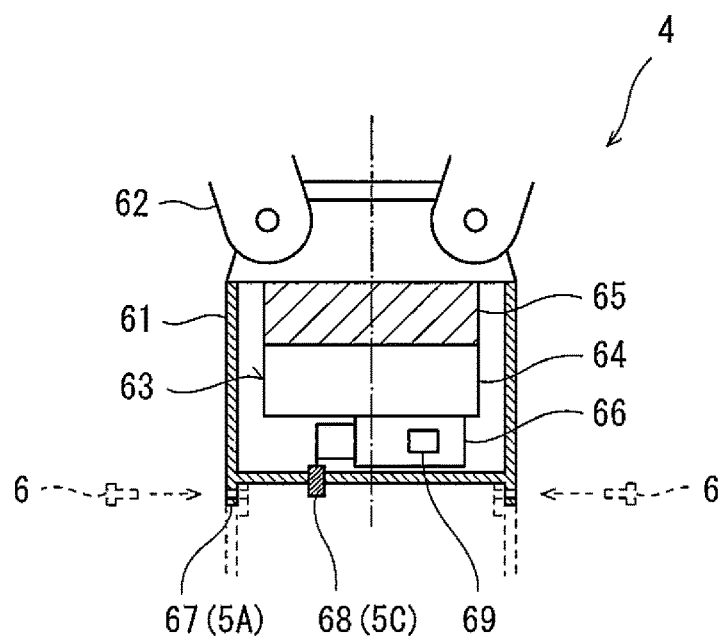
FIG. 9 is a schematic cross-sectional view taken along the arrow IX-IX of FIG. 8.

Next, the end effector unit 4 will be described with reference to FIGS. 8 and 9. FIG. 8 is a perspective view of the end effector unit 4, and FIG. 9 is a schematic cross-sectional view taken along the arrow IX-IX of FIG. 8. The end effector unit 4 includes a base 61 and an end effector 62.

The end effector 62 is provided to enable the articulated robot 1 to perform a specific work. In the present embodiment, the end effector 62 is a chuck configured to grasp a work object. The form of the end effector of the end effector unit 4 is not limited to that of this embodiment. The base 61 includes an actuator 63 built therein to move the end effector 62. The actuator 63 includes a motor 64 and a reduction gear 65.

The base 61 further includes a motor driver 66 built therein to control driving of the motor 64. The base 61 further includes a position detector 66a (see FIG. 10) built therein to detect the rotational position of the motor 64. The motor driver 66 includes an amplifier and generates a motor current delivered to the motor 64 based on a control signal sent from the control unit 2. The position detector 66a detects the rotational position (rotational angle) of the motor shaft and gives feedback to the motor driver 66. The position detector 66a is, for example, a resolver or an encoder.

The base 61 is provided with an end effector unit mechanical connector 67 for mechanical connection to the joint unit 3. The end effector unit mechanical connector 67 includes a first connection structure 5A as described later.

The base 61 is provided with an end effector unit electrical connector 68 for electrical connection to the joint unit 3. The end effector unit electrical connector 68 includes a third connection structure 5C as described later.

The motor driver 66 is provided with a memory 69 storing type information for identification of the type of the end effector unit 4. The memory 69 is, for example, a flash memory. The memory 69 further stores manufacturing information such as a manufacturing number of the end effector unit 4 including the memory 69.

A light emitter 70 is provided on the outer circumferential surface of the base 61, and the light emitter 70 is configured to provide light emission that allows distinguishing whether the end effector unit 4 is in a normal state or an abnormal state. The light emitter 70 may, for example, consist of one LED or a plurality of LEDs.

Structures for Connection Between Units

Mechanical Connection

The articulated robot 1 is a customizable robot whose configuration can be changed according to the demand of the user. That is, the connectors of the units 2, 3, and 4 can be coupled in any arbitrary fashion.

Specifically, the stationary body-side mechanical connector 30 of the torsion joint unit 3A, the stationary body-side mechanical connector 50 of the bending joint unit 3B, and the end effector unit mechanical connector 67 of the end effector unit 4 have the same first connection structure 5A. The control unit mechanical connector 15 of the control unit 2, the rotatable body-side mechanical connector 31 of the torsion joint unit 3A, and the rotatable body-side mechanical connector 51 of the bending joint unit 3B have the same second connection structure 5B. The first connection structure 5A and the second connection structure 5B are connectable to each other.

As such, for example, the torsion joint unit 3A can be coupled to any unit selected from the control unit 2, another torsion joint unit 3A, the bending joint unit 3B, and the end effector unit 4. Further, for example, the bending joint unit 3B can be coupled to any unit selected from the control unit 2, the torsion joint unit 3A, another bending joint unit 3B, and the end effector unit 4. Thus, in the articulated robot 1, the number of the joint units 3 or the combination of the joint unit 3 with another unit can be changed to change the degrees of freedom or the motion range of the articulated robot 1.

In the present embodiment, the first connection structure 5A is in the shape of a hollow circular cylinder, and the second connection structure 5B is in the shape of a hollow circular cylinder (or a solid circular cylinder) such that the second connection structure 5B can be fitted inside the inner circumferential wall of the first connection structure 5A. Through holes are provided in the outer circumference of the hollow circular cylindrical part of the first connection structure 5A, and screw holes are provided in the outer circumference of the hollow circular cylindrical part of the second connection structure 5B. The holes are arranged such that the locations of the screw holes coincide with the locations of the through holes when the second connection structure 5B is fitted into the first connection structure 5A. The hollow circular cylindrical part of the second connection structure 5B is fitted into the hollow circular cylindrical part of the first connection structure 5A such that the locations of the through holes and the screw holes coincide with each other and, in this state, bolts 6 (see FIGS. 3, 5, 7A, 7B, and 9) are inserted into the through holes of the hollow circular cylindrical part of the first connection structure 5A to secure the hollow circular cylindrical parts together. In this manner, the first connection structure 5A and the second connection structure 5B are connected to each other.

The first connection structure 5A and the second connection structure 5B may be configured in any manner that allows the connection structures to be connected to each other. For example, the first connection structure 5A and the second connection structure 5B may be configured such that fitting of the first connection structure 5A into the second connection structure 5B is made instead of fitting of the second connection structure 5B into the first connection structure 5A. The first connection structure 5A and the second connection structure 5B are desirably connection structures configured such that the position of the unit having the first connection structure 5A and the position of the adjoining unit having the second connection structure 5B are fixed relative to each other once the connection structures are connected.

Electrical Connection

In the present embodiment, the units are configured such that they can be electrically connected once they are mechanically connected.

Specifically, the stationary body-side electrical connector 32 of the torsion joint unit 3A, the stationary body-side electrical connector 52 of the bending joint unit 3B, and the end effector unit electrical connector 68 of the end effector unit 4 have the same third connection structure 5C. The control unit electrical connector 16 of the control unit 2, the rotatable body-side electrical connector 33 of the torsion joint unit 3A, and the rotatable body-side electrical connector 53 of the bending joint unit 3B have the same fourth connection structure 5D. The third connection structure 5C and the fourth connection structure 5D are connectable to each other.

In each joint unit 3, the stationary body-side electrical connector 32 or 52 extends through the internal space S1 or S2 inside the joint unit 3 and is electrically connected to the rotatable body-side electrical connector 33 or 53. Thus, even when the units are mechanically connected in an arbitrary fashion to construct the articulated robot 1, control signals can be sent from the control unit 2 to the joint units 3 and the end effector unit 4 of the articulated robot 1 without the need for additionally preparing electrical wires.

The third connection structure 5C and the fourth connection structure 5D may be configured in any manner that allows the connection structures to be connected to each other. For example, the third connection structure 5C may be a male connector having a core line with a protruding connection portion, and the fourth connection structure 5D may be a female connector adapted to mate with the male connector. Alternatively, the third connection structure 5C may be a female connector, and the fourth connection structure 5D may be a male connector.

In the present embodiment, when the units are mechanically connected, one of the first connection structure 5A and the second connection structure 5B is fitted into the other such that the third connection structure 5C and the fourth connection structure 5D are connected to each other. If one or both of the third connection structure 5C and the fourth connection structure 5D are not secured to the casings of the units but are supported only by the wiring parts, the third connection structure 5C and the fourth connection structure 5D may be connected first, and then one of the first connection structure 5A and the second connection structure 5B may be fitted into the other.

Control System

Figure 10:
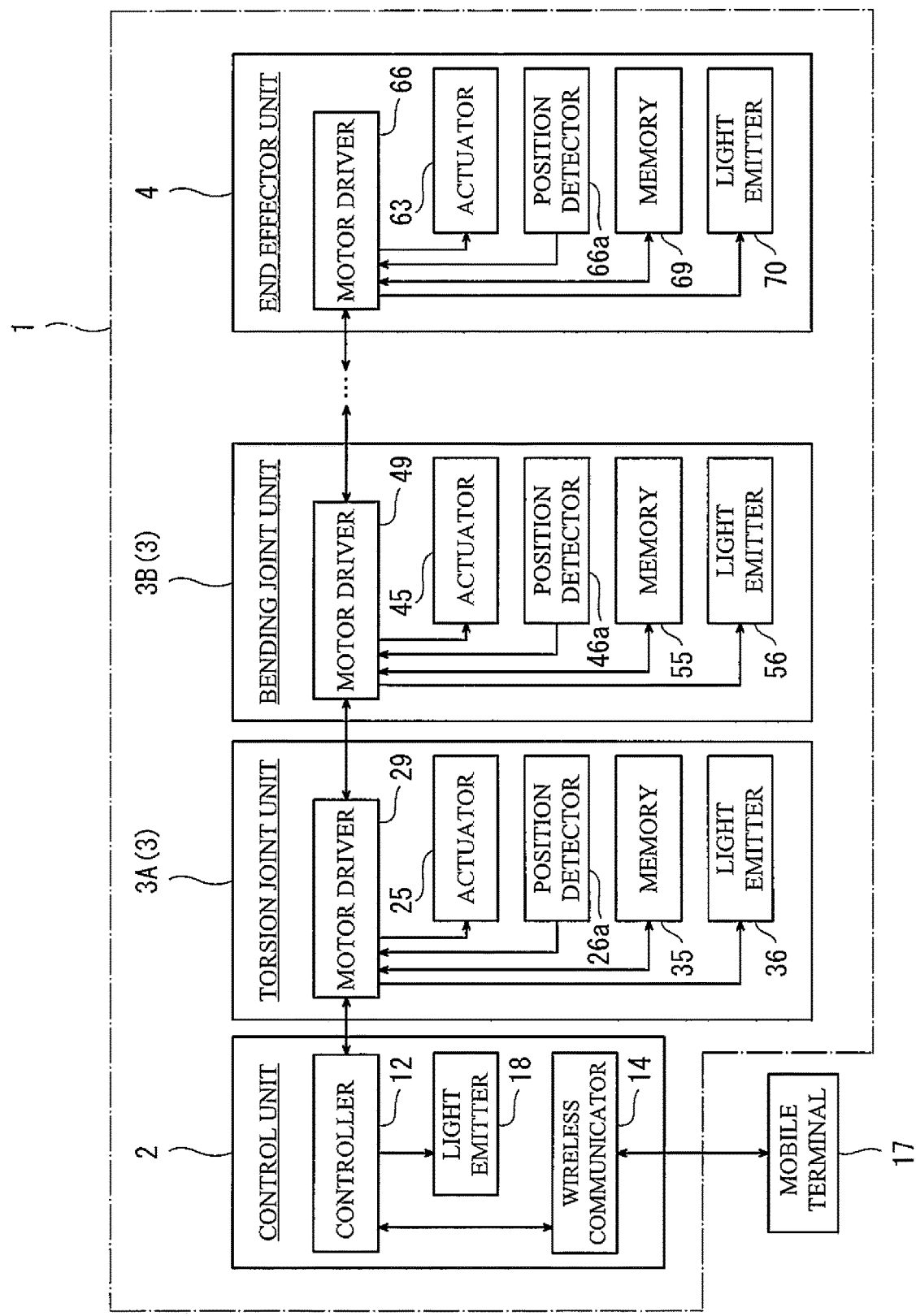
FIG. 10 is a block diagram showing a control system of the articulated robot shown in FIG. 1.

Next, the control system of the articulated robot 1 will be described with reference to FIG. 10. FIG. 10 is a block diagram showing the control system of the articulated robot 1. In FIG. 10, among the joint units 3 of the articulated robot 1, only the first joint unit 3 (torsion joint unit 3A) and the second joint unit 3 (bending joint unit 3B) as counted from the control unit 2 are shown, and the third and subsequent joint units 3 are omitted.

The motions of the joint units 3 and the end effector unit 4 are controlled by the controller 12 of the control unit 2. As shown in FIG. 10, the motor drivers 29, 49, and 66 of the units (in particular, the CPUs of the motor drivers 29, 49, and 66) are connected in series from the controller 12 of the control unit 2. A control signal sent from the controller 12 passes sequentially through the motor drivers 29 and 49 of the joint units 3 to the motor driver 66 of the end effector unit 4 in the direction from the proximal end to the distal end. The control signal sent from the controller 12 contains command values for the different units. The motor driver 29, 49, or 66 of each unit obtains data (command value) associated with the unit from the data contained in the control signal, and controls the motion of the actuator of the unit based on the obtained data.

In order to control the motion of the articulated robot 1, the controller 12 needs to know the configuration of the articulated robot 1, i.e., how many joint units 3 the articulated robot 1 includes and which type of the joint unit 3 is located at which position as counted from the control unit 2.

Hereinafter, setting up for enabling the controller 12 to know the configuration of the articulated robot 1 will be described in detail.

It is assumed that the user who owns the articulated robot 1 has coupled the units together to construct the articulated robot 1 as shown in FIG. 1. After that, the user makes setting up of the articulated robot 1 by operating the mobile terminal 17. In the setting up, the controller 12 sends a signal requesting configuration information of the articulated robot 1 (such a signal will hereinafter be referred to as "configuration information requesting signal") to the motor drivers.

The motor driver 66 of the end effector unit 4 is provided with a terminator such as an end plug. The controller 12 sends a configuration information requesting signal to the motor driver 66 located at the distal end of the articulated robot 1 via the motor drivers 29 and 49 of the joint units 3. Once the motor driver 66 of the end effector unit 4 receives the configuration information requesting signal, the motor driver 66, which itself is provided with the terminator, detects that the end effector unit 4 is an end unit of the coupled units (i.e., that the end effector unit 4 is the first unit from the distal end). The motor driver 66 stores the detected information into the memory 69. Subsequently, the motor driver 66 of the end effector unit 4, based on the type information stored in the memory 69, sends information indicating that the first unit from the distal end is the end effector unit 4 (first unit information) to the motor driver 29 of the torsion joint unit 3A adjoining the proximal end side of the end effector unit 4.

The motor driver 29 of the torsion joint unit 3A adjoining the end effector unit 4 receives the first unit information. Thus, the motor driver 29 detects that the unit including the motor driver 29 is the second unit from the distal end of the articulated robot 1. The motor driver 29 stores the detected information into the memory 35. Subsequently, the motor driver 29, based on the type information stored in the memory 35, sends the first unit information and other information indicating that the second unit from the distal end of the articulated robot 1 is the torsion joint unit 3A (second unit information) to the motor driver 49 of the bending joint unit 3B adjoining the proximal end side of the torsion joint unit 3A.

In the manner described above, the unit information is sent to the units sequentially in the direction from the distal end to the proximal end of the articulated robot 1. Finally, the motor driver 29 of the torsion joint unit 3A adjoining the control unit 2 detects, based on the unit information (in particular, first to fifth unit information) sent from the distal end side, that the unit including the motor driver 29 is the sixth unit from the distal end of the articulated robot 1. The motor driver 29 stores the detected information into the memory 35. Subsequently, the motor driver 29, based on the type information stored in the memory 35, sends the information about the first to fifth units from the distal end of the articulated robot 1 (first to fifth unit information) and other information indicating that the sixth unit from the distal end of the articulated robot 1 is the torsion joint unit 3A (sixth unit information) to the controller 12 of the control unit 2.

As described above, the memories of the joint units 3 and the end effector unit 4 store the information indicating at which position each unit is as counted from the distal end of the articulated robot 1. Thus, the controller 12 recognizes the configuration of the articulated robot 1, i.e., which type of the joint unit 3 is located at which position as counted from the distal end of the articulated robot 1. The result of recognition by the controller 12 is sent from the controller 12 to the mobile terminal 17 via the wireless communicator 14.

Once the setting up is completed as described above, the articulated robot 1 becomes operable by control signals from the controller 12. Specifically, when the user operates the mobile terminal 17 in order to cause the articulated robot 1 to start moving, a motion start command is sent from the mobile terminal 17 to the controller 12 via the wireless communicator 14. The controller 12 sends a control signal to the units based on a motion program stored in advance or sent from the mobile terminal 17. The motion program may be, for example, a program created by the user using a known direct teaching technique or a program downloaded from an administrative server managed by a distributor (such as the robot manufacturer) of the units constituting the articulated robot 1. The controller 12 sends a control signal to the motor drivers connected in series, the control signal containing motion command information and being configured to allow determination of which of the units as counted from the distal end of the articulated robot 1 is the destination of the motion command information. In each unit, the motor driver obtains the corresponding motion command information based on the information stored in the memory and indicating at which position the unit is as counted from the distal end, and drives the actuator based on the obtained motion command information.

As previously mentioned, the memory 35 or 55 of each joint unit 3 stores rotational position information indicating a predetermined rotational position of the rotatable body 22 or 42 relative to the stationary body 21 or 41. In a specific example, a reference position of the rotatable body 22 or 42 relative to the stationary body 21 or 41 is set according to the type of the joint unit 3, and the memory 35 or 55 stores a value detected by the position detector 26a or 46a when the rotatable body 22 or 42 is in the reference position. Since the reference position is stored in the memory 35 or 55 for each joint unit 3 according to the type of the joint unit 3, if, for example, the joint unit 3 having an abnormality is replaced with another joint unit 3 of the same type, the controller 12 can, after replacement, move the other joint unit 3 with a command value which is the same as that used before replacement.

The memory 35 or 55 of each joint unit 3 may store rotational position information detected when the joint unit assumes a posture defined as a basic posture in the articulated robot 1 (this posture will hereinafter be referred to as "reference posture"). The reference posture of each unit in the articulated robot 1 can be changed by rewriting the rotational position information in the memory of the unit. This rewriting can be executed by the controller 12 directly or through the motor driver of the unit.

If a part of the units constituting the articulated robot 1 has an abnormality, the articulated robot 1 may fail to move properly. In this case, the user needs to identify which of the units in the articulated robot 1 has the abnormality. In the present embodiment, the control unit 2, the torsion joint unit 3A, the bending joint unit 3B, and the end effector unit 4 include the light emitters 18, 36, 56, and 70, respectively, and whether each unit is in a normal state or an abnormal state can be distinguished depending on the mode of light emission (such as the color of emitted light and the blinking period) of the light emitter 18, 36, 56, or 70.

Whether the control unit 2 is in a normal state or an abnormal state is determined by the controller 12 included in the control unit 2. Whether the torsion joint unit 3A is in a normal state or an abnormal state is determined by the motor driver 29 included in the torsion joint unit 3A. Whether the bending joint unit 3B is in a normal state or an abnormal state is determined by the motor driver 49 included in the bending joint unit 3B. Whether the end effector unit 4 is in a normal state or an abnormal state is determined by the motor driver 66 included in the end effector unit 4. Thus, the determination of the presence or absence of an abnormality is made for each unit, and the user is notified of the result of the determination for each unit through the light emitter.

For example, in the torsion joint unit 3A, the motor driver 29 determines whether the torsion joint unit 3A moves properly and, upon determining that the torsion joint unit 3A moves properly, causes the light emitter 36 to be and remain illuminated. Upon determining that the torsion joint unit 3A has an abnormality, the motor driver 29 causes the light emitter 36 to blink. An example of situations where the motor driver 29 of the torsion joint unit 3A determines that there is an abnormality is a situation where the motor driver 29 fails to output a desired current or fails to communicate with the position detector 26a. Since, as described above, the presence or absence of an abnormality can be distinguished for each unit through the light emitter, the user can quickly identify which of the units in the articulated robot 1 has the abnormality.

Instead of, or in addition to, providing the light emitter in each unit, information indicating which of the units has an abnormality may be sent from the controller 12 to the mobile terminal 17 and displayed on the mobile terminal 17. As to an abnormality other than abnormalities of each unit, namely an overall abnormality of the articulated robot 1 such as that in the motion speed of the articulated robot 1 as a whole, the controller 12 may determine whether the articulated robot 1 has such an abnormality. In this case, in order to distinguish between an abnormal state of the control unit 2 itself and an overall abnormal state of the articulated robot 1, the light emitter 18 may provide light emission in different modes for the abnormal state of the control unit 2 and for the overall abnormal state of the articulated robot 1. For example, upon determining that the control unit 2 has an abnormality, the controller 12 may cause the light emitter 18 to emit blinking light of a certain color, while upon determining that there is an overall abnormality of the articulated robot 1, the controller 12 may cause the light emitter 18 to emit blinking light of a different color.

In the articulated robot 1 according to the present embodiment, as described above, the stationary body-side mechanical connector 30 of the torsion joint unit 3A and the stationary body-side mechanical connector 50 of the bending joint unit 3B have the same first connection structure 5A. Further, the rotatable body-side mechanical connector 31 of the torsion joint unit 3A, the rotatable body-side mechanical connector 51 of the bending joint unit 3B, and the control unit mechanical connector 15 have the same second connection structure 5B. As such, when the contents of the work of the articulated robot 1 are to be changed, the number of the joint units 3 included in the articulated robot 1 can easily be increased or decreased, or the positions of the torsion joint unit 3A and the bending joint unit 3B can easily be interchanged, according to the work to be done. Thus, an articulated robot 1 can be provided which allows easy change of the degrees of freedom.

In the present embodiment, the units constituting the articulated robot 1 include the control unit 2 that controls the actuator 25, 45, and 63 of the other units. As such, the need for additionally preparing a robot controller is eliminated, and the articulated robot can be made compact as a whole. Such a compact articulated robot is easily applicable to a wide variety of fields.

In the present embodiment, since the end effector unit mechanical connector 67 having the first connection structure 5A is connectable to the rotatable body-side mechanical connectors 31 and 51 having the second connection structure 5B, the end effector unit 4 can easily be connected to both the torsion joint unit 3A and the bending joint unit 3B.

In the present embodiment, the stationary body-side electrical connector 32 of the torsion joint unit 3A and the stationary body-side electrical connector 52 of the bending joint unit 3B have the same third connection structure 5C. Further, the rotatable body-side electrical connector 33 of the torsion joint unit 3A, the rotatable body-side electrical connector 53 of the bending joint unit 3B, and the control unit electrical connector 16 have the same fourth connection structure 5D. As such, two units can be electrically connected once they are mechanically connected. Hence, a control signal output from the control unit 2 can be sent in the direction from the proximal end to the distal end of the articulated robot 1 through the wiring parts 34 and 54 of the joint units 3 coupled together.

In the present embodiment, since each of the joint units 3 includes the motor driver, the control unit 2 need not be provided with motor drivers for actuating the joint units 3, and thus the control unit 2 can be made compact. Further, the number of the joint units 3 coupled is not limited by the number of motor drivers which would otherwise be included in the control unit 2.

In the present embodiment, since each joint unit 3 includes the memory 35 or 55 storing the type information for identification of the type of the joint unit 3, the control unit 2 can retrieve the type information from the memory 35 or 55 of the joint unit 3 to control the joint unit 3 appropriately depending on the type of the joint unit 3.

In the present embodiment, the memory 35 or 55 of each joint unit 3 stores rotational position information indicating a predetermined rotational position of the rotatable body 22 or 42 relative to the stationary body 21 or 41. As such, for example, a posture to be assumed by each joint unit 3 (a rotational position to be taken by the rotatable body relative to the stationary body) in order to allow the articulated robot 1 to assume a certain posture can be stored in the joint unit 3 itself.

In the present embodiment, since the control unit 2 includes the wireless communicator 14 configured to wirelessly communicate with the external mobile terminal 17, the user can send a motion command to the articulated robot 1 by operating the external mobile terminal 17.

In the present embodiment, since each joint unit 3 includes the light emitter 36 or 56 configured to provide light emission that allows distinguishing whether the joint unit 3 is in a normal state or an abnormal state, the presence or absence of an abnormality in each joint unit 3 can be known through the light emitter 36 or 56 of the joint unit 3, and replacement of a joint unit 3 which is in an abnormal state is facilitated.

The present invention is not limited to the embodiment described above, and various modifications can be made without departing from the gist of the present invention.

For example, the configurations or shapes of the units which are constituent elements of the articulated robot of the present invention are not limited to those in the above embodiment. For example, while the articulated robot 1 of the above embodiment is a five-axis robot having five joints, the number of the joint units of the articulated robot of the present invention may be any number other than five (e.g., two).

While in the above embodiment the torsion joint unit 3A and the bending joint unit 3B are described as the joint units 3, another type of joint unit may be used in the articulated robot 1. For example, the joint unit 3 may be a linearly movable joint unit including a displaceable body configured to make linear reciprocating movement relative to a stationary body.

While in the above embodiment the end effector unit mechanical connector 67 includes the first connection structure 5A, the present invention is not limited to this configuration. For example, the end effector unit and the joint unit may be connected via a connection interface additionally provided between the units.

While in the above embodiment the units are configured to be connected electrically once they are mechanically connected, the present invention is not limited to this configuration. For example, a wire may be provided through which a signal is sent from the control unit 2 directly to the joint unit 3 or end effector unit 4 which does not adjoin the control unit 2. Further, the motor drivers for control of the actuators of the units may all be provided in the control unit, instead of being respectively included in the units.

While in the above embodiment the motor drivers of the joint units 3 and end effector unit 4 are electrically connected in series as shown in FIG. 10, the present invention is not limited to this configuration. For example, the motor drivers may be electrically connected such that control signals from the controller 12 are sent to the motor drivers in a parallel fashion.

While in the above embodiment the articulated robot 1 is operated by means of the mobile terminal 17 via the wireless communicator 14 of the control unit 2, the articulated robot 1 may be operated by means of a computer connected to the control unit 2 through a wire. While in the above embodiment the controller 12 receives electrical power supplied from an external power supply through the electrical power supply port 13, a battery unit connectable to the control unit may be prepared and connected to the control unit to supply electrical power to the controller. In order to improve the waterproofness of the articulated robot 1, waterproof jackets may be prepared to cover the units.

While in the above embodiment the articulated robot 1 is moved based on a motion program, the articulated robot 1 may be moved based on an operation signal sent from an external device such as a joystick or a mobile terminal.

While in the above embodiment each unit includes a light emitter as the notifier configured to provide a notification that allows distinguishing whether the unit is in a normal state or an abnormal state, the notifier is not limited to the light emitter. For example, the notifier may be configured to, when the motor driver 29, 49, or 66 or the controller 12 determines that the unit has an abnormality, output sound for providing a notification of the abnormality of the unit.

Figure 11:
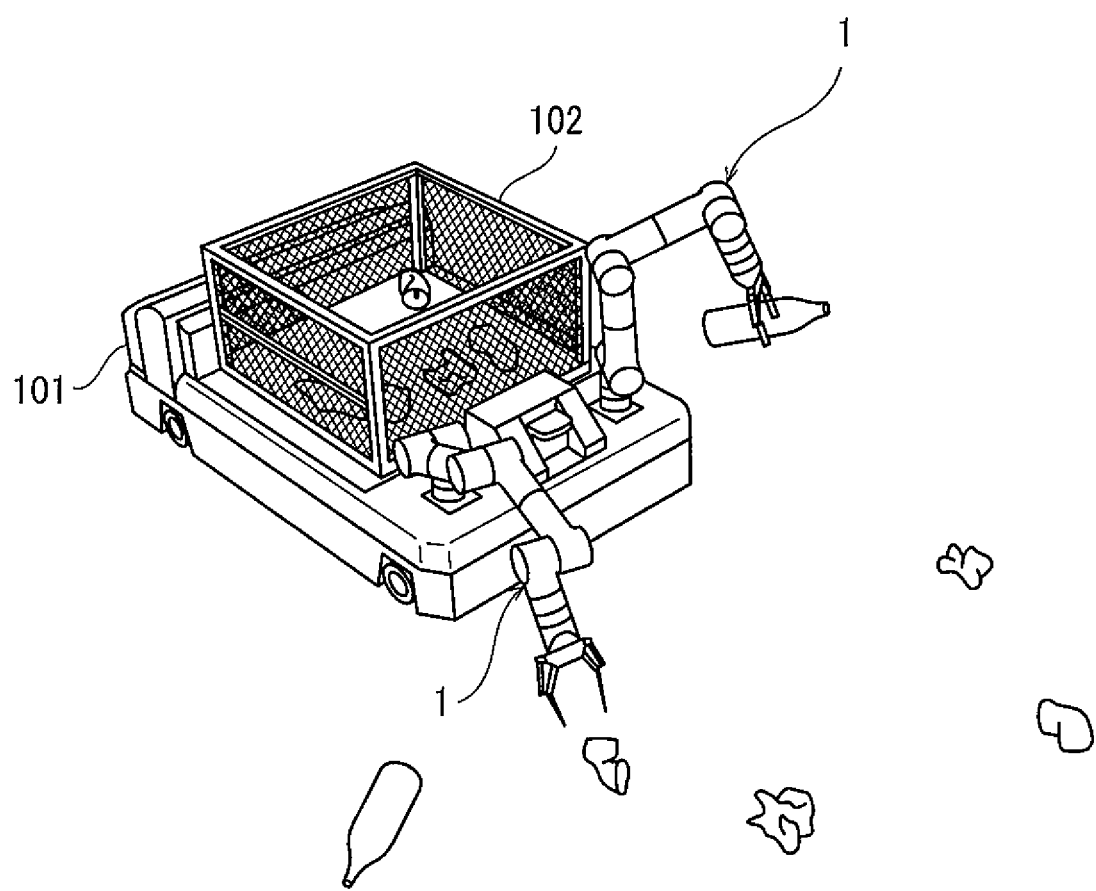
FIG. 11 shows an example of application of the articulated robot.

The articulated robot of the present invention is applicable to a wide variety of fields. For example, the articulated robot of the present invention may be mounted on an automatic guided vehicle (AGV) which travels without any human operator and may be used to perform a specific work. FIG. 11 shows an example where two articulated robots 1 mounted on an automatic guided vehicle 101 are used as trash-picking robots which are operated to pick up trash on a travel route of the automatic guided vehicle 101 and put the picked-up trash into a box 102 disposed on the automatic guided vehicle 101.

Figure 12:
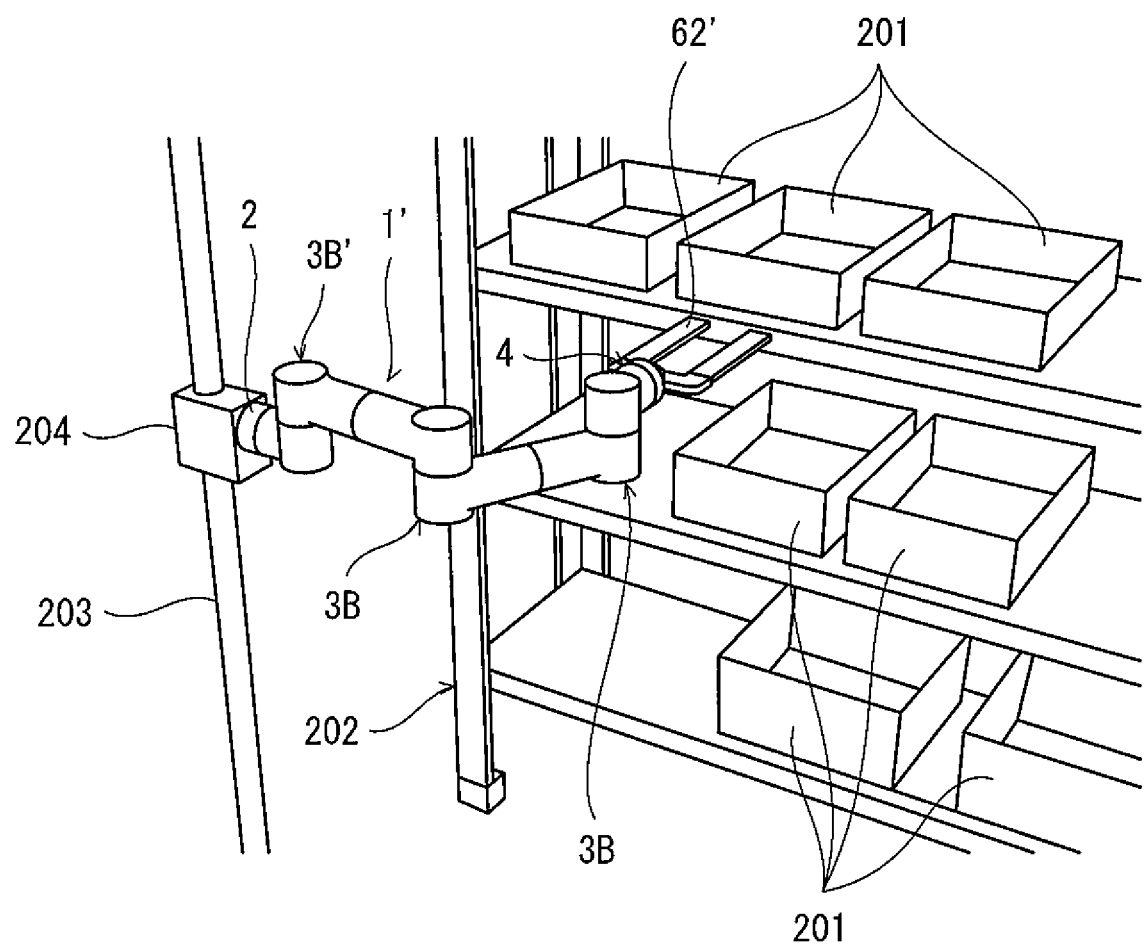
FIG. 12 shows another example of application of the articulated robot.

The articulated robot of the present invention can be used also as a container-transporting robot. FIG. 12 shows an example where an articulated robot 1' according to another embodiment of the present invention is used as a container-transporting robot. The articulated robot 1' differs from the articulated robot 1 of the above-described embodiment in that the articulated robot 1' is a horizontal articulated robot including bending joint units 3B and 3B' differing from each other in the displacement of the displaceable body-side mechanical connector about the vertical axis relative to the stationary body-side mechanical connector. Specifically, the bending joint units 3B and 3B' differ in the distance from the stationary body-side mechanical connector to the vertical axis. The articulated robot 1' includes an end effector 62' configured to support a container 201 from below. The articulated robot 1' is supported by a linearly movable part 204 connected to the control unit 2 of the articulated robot 1' and configured to move linearly along a pole 203 extending in the vertical direction. The articulated robot 1' cooperates with the linearly movable part 204 to take the container 201 containing an unillustrated product from a rack 202 or place the container 201 on the rack 202.

Additionally, the articulated robot of the present invention can be mounted on a wheelchair or a nursing care bed. In this case, the articulated robot may be configured to move in response to an operation performed by the user on an operating part such as a joystick.

REFERENCE SIGNS LIST

1: articulated robot
2: control unit
3: joint unit
3A: torsion joint unit
3B: bending joint unit
4: end effector unit
5A: first connection structure
5B: second connection structure
5C: third connection structure
5D: fourth connection structure
12: controller
14: wireless communicator
15: control unit mechanical connector
16: control unit electrical connector
17: wireless communicator
21: stationary body
22: rotatable body (displaceable body)
25: actuator
26: motor
27: reduction gear
28: hollow cylindrical part (coupler)
29: motor driver
30: stationary body-side mechanical connector
31: rotatable body-side mechanical connector (displaceable body-side mechanical connector)
32: stationary body-side electrical connector
33: rotatable body-side electrical connector (displaceable body-side electrical connector)
34: wiring part
35: memory
36: light emitter (notifier)
41: stationary body
42: rotatable body (displaceable body)
43: stationary body-side casing part
44: rotatable body-side casing part
45: actuator
46: motor
47: reduction gear
48: solid circular cylindrical part (coupler)
49: motor driver
50: stationary body-side mechanical connector 51: rotatable body-side mechanical connector (displaceable body-side mechanical connector)
52: stationary body-side electrical connector
53: rotatable body-side electrical connector (displaceable body-side electrical connector)
54: wiring part
55: memory
62: end effector
67: end effector unit mechanical connector
68: end effector unit electrical connector

The invention claimed is:

1. An articulated robot comprising a plurality of units coupled in order from a proximal end of the articulated robot to a distal end of the articulated robot, the plurality of units including:
   different types of a plurality of joint units, each joint unit including (i) a stationary body, (ii) a stationary body-side mechanical connector provided in the stationary body that mechanically connects to another unit of the plurality of units, (iii) a displaceable body coupled to the stationary body by a coupler, (iv) a displaceable body-side mechanical connector provided in the displaceable body that mechanically connects to another unit of the plurality of units, and (v) an actuator configured to displace the displaceable body relative to the stationary body; and
   a control unit including a controller configured to control the actuator and a control unit mechanical connector that mechanically connects to another unit of the plurality of units, wherein:
      each of the different types of joint units and the control unit includes a notifier configured to provide a notification indicating whether the respective joint unit or control unit is in a normal state or an abnormal state,
      displacement undergone by the displaceable body-side mechanical connector relative to the stationary body-side mechanical connector upon displacement of the displaceable body relative to the stationary body differs depending on the type of the joint unit,
      the stationary body-side mechanical connector includes a first connection structure,
      the displaceable body-side mechanical connector and the control unit mechanical connector each include a second connection structure, and
      the first connection structure and the second connection structure are connectable to each other.

2. The articulated robot according to claim 1, wherein the different types of joint units include at least:
   a torsion joint unit configured to rotate the displaceable body relative to the stationary body about an axis extending in a direction from the stationary body-side mechanical connector to the coupler; and
   a bending joint unit configured to rotate the displaceable body relative to the stationary body about an axis perpendicular to a direction from the stationary body-side mechanical connector to the coupler.

3. The articulated robot according to claim 1, wherein
the plurality of units includes an end effector unit including an end effector configured to perform a specific work, and
the end effector unit includes an end effector unit mechanical connector for mechanical connection to another unit of the plurality of units, the end effector unit mechanical connector including the first connection structure.

4. The articulated robot according to claim 1, wherein
each joint unit includes a stationary body-side electrical connector provided in the stationary body for electrical connection to another unit of the plurality of units, a displaceable body-side electrical connector provided in the displaceable body for electrical connection to another unit of the plurality of units, and a wiring part configured to establish electrical connection between the stationary body-side electrical connector and the displaceable body-side electrical connector,
the control unit includes a control unit electrical connector for electrical connection to another unit of the plurality of units, the control unit electrical connector being configured to allow the controller to output a control signal for control of the actuator,
the stationary body-side electrical connector includes a third connection structure,
the displaceable body-side electrical connector and the control unit electrical connector each include a fourth connection structure, and
the third connection structure and the fourth connection structure are connectable to each other.

5. The articulated robot according to claim 1, wherein
the actuator includes a motor, and
each joint unit includes a motor driver configured to, based on a control signal sent from the control unit, generate a motor current delivered to the motor.

6. The articulated robot according to claim 1, wherein each joint unit includes a memory storing type information for identification of the type of the joint unit.

7. The articulated robot according to claim 6, wherein the memory stores positional information indicating a predetermined position of the displaceable body relative to the stationary body.

8. The articulated robot according to claim 1, wherein the control unit includes a wireless communicator configured to wirelessly communicate with an external mobile terminal.

* * * * *